United States Patent
Chu et al.

(10) Patent No.: US 9,730,255 B1
(45) Date of Patent: Aug. 8, 2017

(54) ROOM-SPECIFIC PAIRING VIA A COMBINED ULTRASONIC BEACON/BLUETOOTH APPROACH

(71) Applicant: Polycom, Inc., San Jose, CA (US)

(72) Inventors: Peter L. Chu, Lexington, MA (US); Greg Pelton, Raleigh, NC (US)

(73) Assignee: Polycom, Inc., San Jose, CA (US)

( * ) Notice: Subject to any disclaimer, the term of this patent is extended or adjusted under 35 U.S.C. 154(b) by 0 days.

(21) Appl. No.: 15/251,126

(22) Filed: Aug. 30, 2016

(51) Int. Cl.
*H04W 76/02* (2009.01)
*H04W 48/16* (2009.01)
*H04W 48/08* (2009.01)
*H04W 4/00* (2009.01)
*H04L 29/06* (2006.01)
*H04B 11/00* (2006.01)
*H04N 7/15* (2006.01)
*H04N 7/14* (2006.01)
*H04W 84/12* (2009.01)

(52) U.S. Cl.
CPC ............ *H04W 76/02* (2013.01); *H04B 11/00* (2013.01); *H04L 65/403* (2013.01); *H04N 7/147* (2013.01); *H04N 7/15* (2013.01); *H04W 4/008* (2013.01); *H04W 48/08* (2013.01); *H04W 48/16* (2013.01); *H04W 84/12* (2013.01)

(58) Field of Classification Search
CPC ..... H04W 76/02; H04W 4/008; H04W 48/08; H04W 48/06; H04W 84/12; H04B 11/00; H04L 65/403; H04N 7/147; H04N 7/15
USPC ....................................................... 455/41.2
See application file for complete search history.

(56) References Cited

U.S. PATENT DOCUMENTS

| | | | | |
|---|---|---|---|---|
| 7,574,198 B2* | 8/2009 | Ishidoshiro | ......... | H04L 63/1466 380/247 |
| 8,368,737 B2* | 2/2013 | Ravi | ...................... | H04N 7/148 348/14.02 |
| 8,446,320 B2* | 5/2013 | Kuehnel | ............... | G01S 5/0242 342/357.49 |
| 8,614,669 B2* | 12/2013 | Marc | ...................... | G06F 3/0304 345/158 |
| 8,886,782 B2* | 11/2014 | Lucero | ................... | G06Q 50/01 709/203 |
| 8,896,651 B2* | 11/2014 | Chu | ..................... | H04L 65/1069 348/14.02 |
| 9,172,605 B2* | 10/2015 | Hardy | ................. | H04L 41/0806 |
| 9,288,751 B2* | 3/2016 | Finkelstein | ........... | H04W 48/20 |
| 9,432,361 B2* | 8/2016 | Mahaffey | ............ | H04L 63/0853 |
| 9,438,993 B2* | 9/2016 | Gardenfors | ............ | H04R 3/005 |
| 9,479,920 B1* | 10/2016 | Mayor | .............. | H04W 52/0209 |
| 9,549,153 B1* | 1/2017 | Delorenzi | ................ | H04N 7/15 |
| 2003/0228842 A1* | 12/2003 | Heinonen | ............ | H04L 63/083 455/41.2 |

(Continued)

*Primary Examiner* — Hai V Nguyen
(74) *Attorney, Agent, or Firm* — Blank Rome, LLP

(57) ABSTRACT

Embodiments disclosed describe room specific pairing of electronic devices using the combination of ultrasonic signal and other wireless means such as Bluetooth. The ultrasonic signal is used to communicate a unique identifier to the electronic devices within the same physical location. The electronic device receiving the ultrasonic signal uses the unique identifier to establish a secure wireless communication with the base station. The wireless communication is then used to communication the configuration information for a second network connection between the base station and the electronic device.

24 Claims, 10 Drawing Sheets

(56) References Cited

U.S. PATENT DOCUMENTS

| | | | |
|---|---|---|---|
| 2006/0194621 A1* | 8/2006 | Seshadri | H04W 88/02 455/569.1 |
| 2006/0215585 A1* | 9/2006 | Taniwaki | H04L 12/1827 370/260 |
| 2006/0294379 A1* | 12/2006 | Ishidoshiro | H04L 63/1466 713/171 |
| 2007/0153091 A1* | 7/2007 | Watlington | H04N 7/15 348/208.14 |
| 2008/0004904 A1* | 1/2008 | Tran | A61B 5/0006 705/2 |
| 2008/0024593 A1* | 1/2008 | Tsirinsky | H04N 7/148 348/14.08 |
| 2008/0178000 A1* | 7/2008 | Ishidoshiro | H04L 63/1466 713/164 |
| 2008/0198811 A1* | 8/2008 | Deshpande | H04W 48/16 370/332 |
| 2009/0061870 A1* | 3/2009 | Finkelstein | H04W 48/20 455/435.2 |
| 2009/0111443 A1* | 4/2009 | Gupta | H04M 1/72519 455/416 |
| 2009/0204410 A1* | 8/2009 | Mozer | G10L 15/30 704/275 |
| 2009/0298431 A1* | 12/2009 | Rasmussen | H04R 25/554 455/41.3 |
| 2010/0053169 A1* | 3/2010 | Cook | G06F 3/16 345/440.1 |
| 2011/0028160 A1* | 2/2011 | Roeding | G06Q 30/00 455/456.1 |
| 2011/0179182 A1* | 7/2011 | Vadla Ravnas | G06Q 10/10 709/227 |
| 2012/0109688 A1* | 5/2012 | Yoo | G06F 19/3418 705/3 |
| 2013/0106976 A1* | 5/2013 | Chu | H04L 65/1069 348/14.02 |
| 2013/0155173 A1* | 6/2013 | Brady | H04N 7/15 348/14.03 |
| 2013/0217332 A1* | 8/2013 | Altman | H04H 60/90 455/41.2 |
| 2014/0164562 A1* | 6/2014 | King | H04W 8/005 709/217 |
| 2014/0254820 A1* | 9/2014 | Gardenfors | H04R 3/005 381/80 |
| 2014/0274031 A1* | 9/2014 | Menendez | H04W 52/0209 455/426.1 |
| 2014/0282877 A1* | 9/2014 | Mahaffey | H04L 63/0853 726/3 |
| 2015/0131539 A1* | 5/2015 | Tsfaty | H04B 11/00 370/329 |
| 2015/0189006 A1* | 7/2015 | Smus | H04L 67/104 709/204 |
| 2015/0230043 A1* | 8/2015 | Yakir | H04W 4/008 455/426.1 |
| 2015/0264314 A1* | 9/2015 | Goesnar | H04L 12/1818 348/14.08 |
| 2015/0350413 A1* | 12/2015 | Ma | H04M 1/72577 455/418 |
| 2016/0004298 A1* | 1/2016 | Mazed | G09G 3/00 345/633 |
| 2016/0037129 A1* | 2/2016 | Tangeland | G06K 9/00221 348/14.09 |
| 2016/0061613 A1* | 3/2016 | Jung | G01C 21/3632 701/49 |
| 2016/0212103 A1* | 7/2016 | Rhoads | H04W 4/008 |
| 2016/0294768 A1* | 10/2016 | Khan | H04L 61/1511 |
| 2016/0334866 A9* | 11/2016 | Mazed | G09G 3/00 |
| 2016/0337863 A1* | 11/2016 | Robinson | H04W 12/08 |
| 2016/0358475 A1* | 12/2016 | Prokhorov | G05D 1/0011 |
| 2017/0019765 A1* | 1/2017 | Hoyer | H04B 5/0075 |

\* cited by examiner

ROOM-SPECIFIC PAIRING VIA A COMBINED ULTRASONIC BEACON/BLUETOOTH APPROACH

BACKGROUND

1. Field of Invention

The inventions disclosed herein relate to the field of wireless communication. More specifically, but not by way of limitation, it relates to room-specific pairing of electronic devices.

2. Description of the Related Art

Wireless technology is widely used to facilitate communication of video, voice, and data packages between different electronic devices. The ability to "Bring Your Own Device" (BYOD) is a desirable feature of wireless communication systems. With BYOD different participants can connect their own devices such as laptops, tablets, and smartphones to a base station through a wireless network interface such as 802.11 technology. The base station can, for example, facilitate a video/audio conferencing session between the participants. In order to establish such communication, the BYOD must located the network address of the base station, which presents various problems.

Referring to FIG. 1, multiple base stations 110 (referred to base stations 1101 through 1103 individually) are positioned in different physical locations, Site A through Site C. The base stations 110 are capable of establishing a wireless communication between the base stations 110 and electronic devices 120 (referred to electronic devices 1201 through 1208 individually).

Conventionally, the Bluetooth® technology is used to establish the wireless communication between the electronic devices 120 and the based stations 110. Bluetooth pairing is ubiquitous, cheap, and reliable at 30 foot or lesser distances. The bit-rate is more than adequate to send information containing the network address of the base station between the electronic devices 120 and the base stations 110 in a few seconds. However, the Bluetooth radio frequency signal goes through walls quite easily. In case the base stations 110 are in the vicinity of each other, the electronic devices 120 may not know which of the Bluetooth base stations 110 is located in the same room in order to connect to.

For example, the electronic device 1201 may be participating in a meeting in Site A. Therefore, the electronic device 1201 may wish to connect to the base station 1101 to share presentation of video/audio with other electronic devices 1202 and 1203 in the same room and/or other electronic devices that are remotely connected to the base station 1101. However, using Bluetooth technology for pairing, the electronic device 1201 may not be able to determine that the base station 1101 is located in Site A and therefore may mistakenly connect to the base station 1102 or 1103 in Site B or Site C.

Alternatively, an ultrasonic beacon may be used to establish the wireless communication between the base stations 110 and the electronic devices 120 as described in U.S. Pat. No. 8,896,651, which is hereby incorporated by reference. The method is referred to as room-specific pairing because the ultrasonic beacon can only be received within the enclosed room. The ultrasonic signal does not go through the walls. However, the disadvantage of this approach is its very low rate of data transfer. For example, it typically takes several seconds to send a 32 bit IP address reliably. If much more data is required, for example, a 64 bit IP address, the length of time for the data transfer would be unacceptably long. In addition, the ultrasonic communication of the data transfer is only one-way.

SUMMARY

One embodiment discloses room specific pairing of electronic devices using the combination of ultrasonic signal and other wireless means such as Bluetooth technology. In an embodiment, a first base station performs a scanning operation to identify one or more other base stations. Subsequently, the first base station creates a name to identify itself. The name includes a predetermined term and a unique identifier. The unique identifier could be a single byte value, a sequence of integers, a short form Uniform Resource Locator (URL), a Service Set Identifier (SSID), or a specific Bluetooth pairing code.

The base station advertises the unique identifier to other electronic devices within the same physical location. The unique identifier is advertised using ultrasonic signals. Other electronic devices within the same room receive the ultrasonic signals and identify the correct base station to connect to. Subsequently, an electronic device uses at least the unique identifier to communicate with the base station and send a pairing request. The base station responds to the pairing request to communicate configuration information related to a network connection to the electronic device. Using the configuration information, the network connection is established between the base station and the electronic device.

DETAILED DESCRIPTION

The inventions disclosed herein relate to the field of network communication. More specifically, but not by way of limitation, it relates to room-specific pairing of electronic devices using a combined ultrasonic beacon and another wireless technology.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As used herein, the term "a computer system" can refer to a single computer system or a plurality of computer systems working together to perform the function described as being performed on or by a computer system. Similarly, a machine-readable medium can refer to a single physical medium or a plurality of media that may together contain the indicated information stored thereon. A processor can refer to a single processing element or a plurality of processing elements, implemented either on a single chip or on multiple processing chips.

It will be appreciated that in the development of any actual implementation (as in any development project), numerous decisions must be made to achieve the developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design an implementation of systems having the benefit of this disclosure and being of ordinary skill in the design and implementation of computing systems and/or graphics systems.

Figure 1:
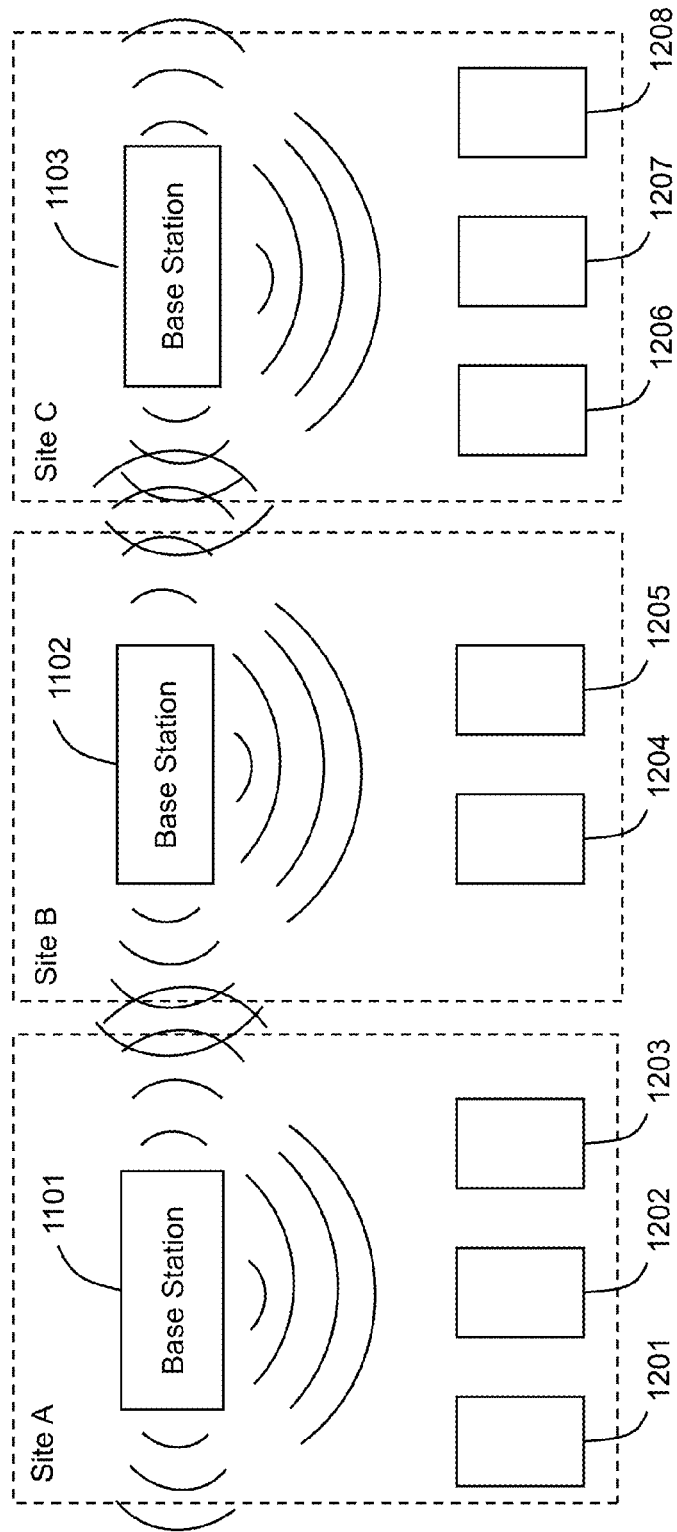
FIG. 1 is a block diagram illustrating a wireless communication system according to the prior art.
Figure 2:
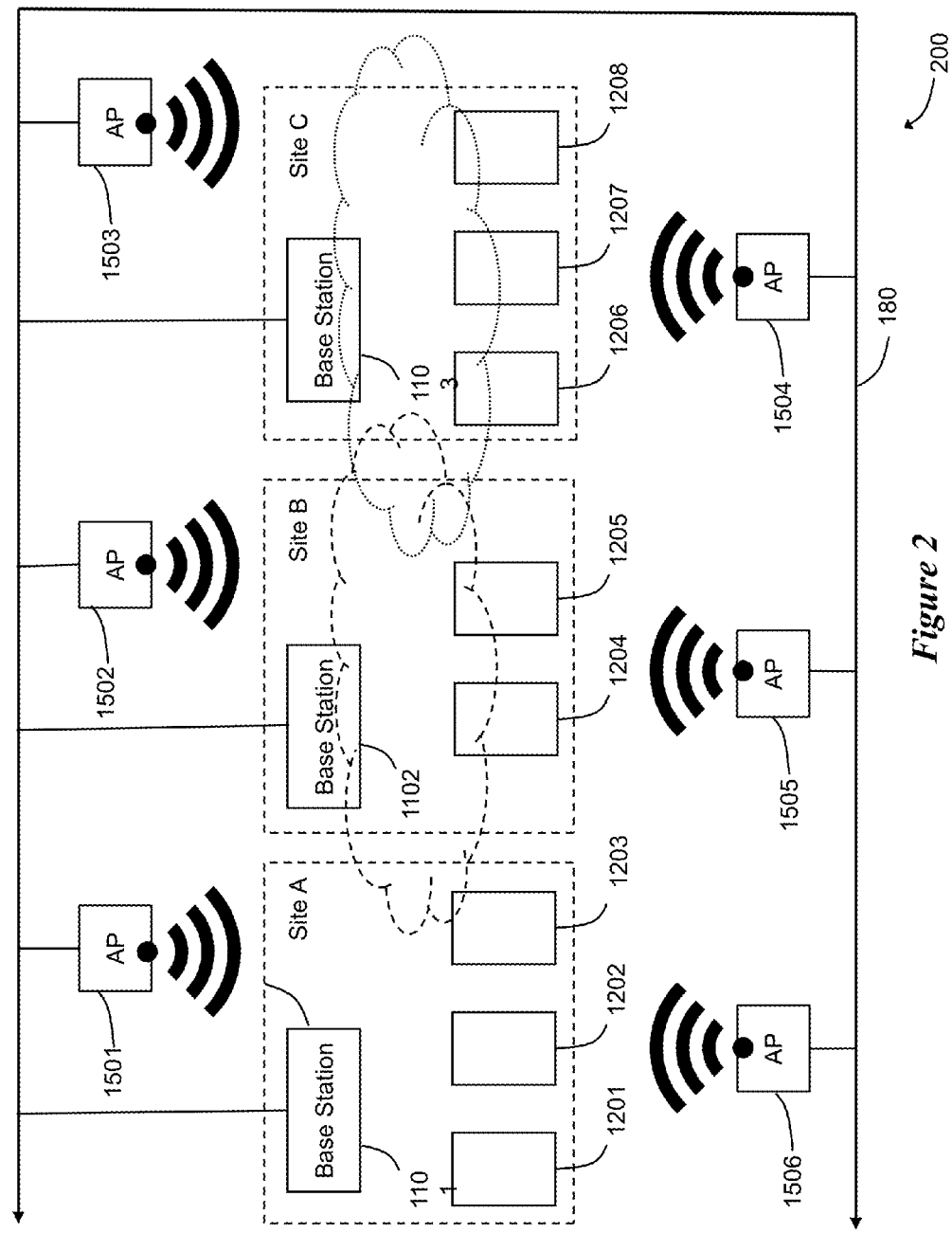
FIG. 2 is a block diagram illustrating a network communication system according to a disclosed embodiment.

Referring to FIG. 2, a network communication system 200 according to one disclosed embodiment is presented. The base station 1101 and other electronic devices 1201, 1202, and 1203 are within a same physical location, Site A. The base station 1102 and other electronic devices 1204 and 1205 are within a same physical location, Site B. Finally, the base station 1103 and other electronic devices 1206, 1207 and 1208 are within a physical location, Site C.

The electronic devices 120 connect to the base stations 110 using Access Points (AP) 150 (referred to AP 1501, 1502, 1503, 1504, 1505, and 1506 individually). The AP 150 are wireless access points (WAP) that allow the WiFi enabled-electronic devices 120 connect to a wired network 180. The wired network 180 then connects the AP 150 to the base station 110.

In an embodiment, some of the base stations 110 initially use a wireless personal area networks (WPAN) established by short-distance wireless network technology such as Bluetooth to connect with the electronic devices 120. In comparison to 802.11 wireless technology, Bluetooth technology may be suitable for exchanging smaller sized data packages and audio conferencing. The WPAN is used to communicate configuration information between the base stations 110 and the electronic devices 120. The configuration information is then used to connect the electronic devices 120 to appropriate base station 110 (for example, the base station in the same physical location as the electronic device) through AP 150.

The electronic devices 120 are wireless-enabled devices, for example, capable of WiFi wireless communications according to the 802.11 standard. The electronic devices 120 may comprise devices such as, for example, a mobile phone, a printer, a laptop, a display device, a projector, a camera, a Bluetooth whiteboard, a speaker, a microphone, a headset, a keyboard, a mouse, and any other devices capable of communicating wirelessly in a wireless network. A more detailed description of the electronic devices 120 are discussed with respect to FIG. 4 below.

The base stations 110 are similarly wireless-enabled devices capable of communicating with the electronic devices 120. Embodiments disclosed are directed generally to the wireless communication between any wireless-enabled electronic devices. In an embodiment, a base station may refer to an electronic device that is capable of wirelessly communicating with multiple electronic devices at the same time. In an embodiment, the base stations are also wireless access points. The base stations 110 may comprise any suitable electronic device such as wireless-enabled video-conferencing unit (VCU), audio conferencing unit (ACU), game console, and smart television.

As shown in FIG. 2, each of the base stations 110 is located at a different physical location. The distance between the physical locations (Site A through Site C) may be such that the electronic devices within the physical locations are within the wireless range of each other, for example in adjacent rooms. In order to pair the electronic devices 120 with the base stations 110, the electronic devices 120 search for the available wireless devices. Pairing is referred to as establishing a secure communication between the electronic devices. However, during the scanning process, electronic device 1201, for example, may identify all three base stations 1101 through 1103 without knowing which one of the base stations belongs to Site A. Disclosed embodiments describe a pairing solution that takes advantage of one improved version of an ultrasonic beacon in combination with another wireless technology such as Bluetooth or WiFi to provide a room-specific pairing technique.

Figure 3:
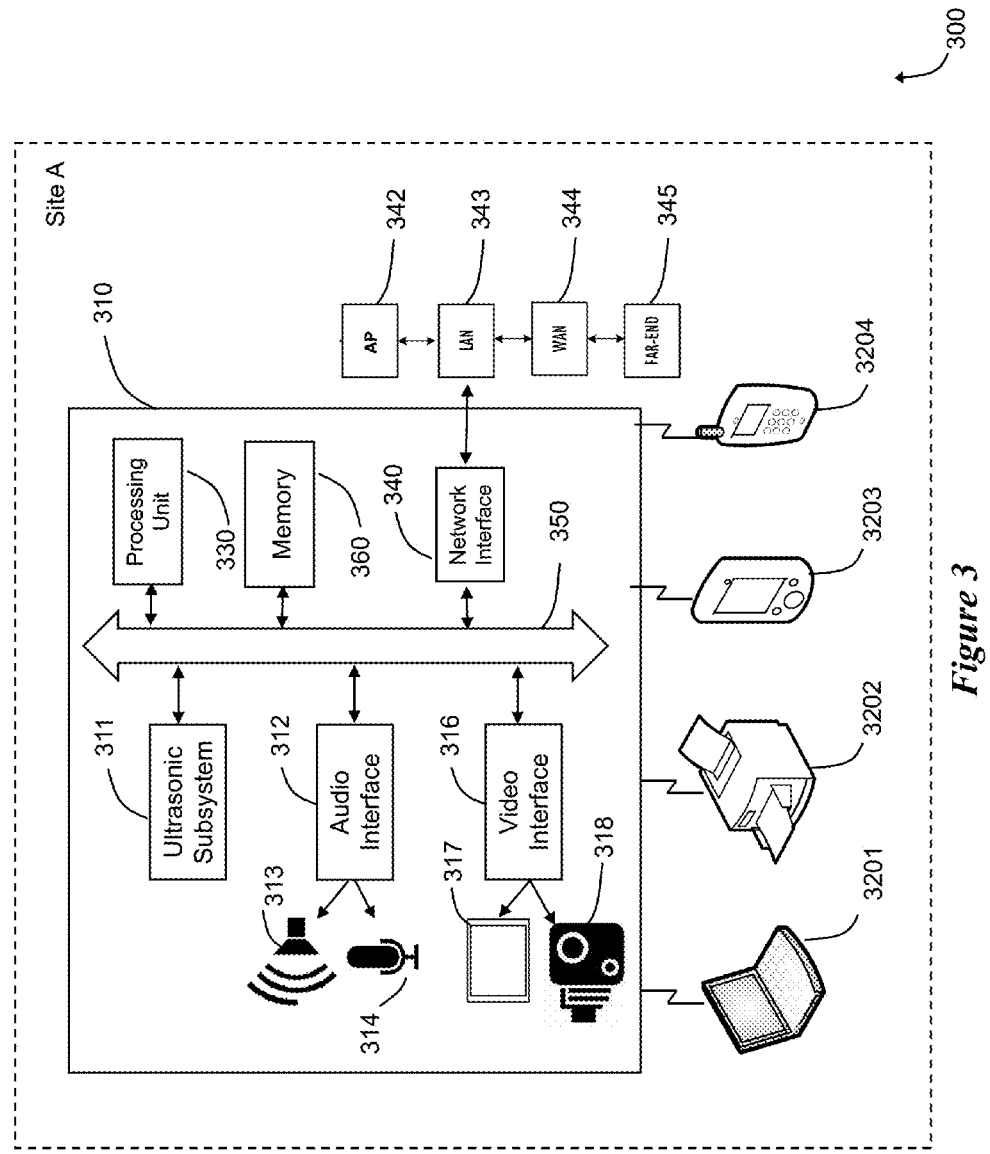
FIG. 3 is a block diagram illustrating a device that may be used, for example, as a base station.

Referring to FIG. 3, a block diagram 300 including a base station 310 for wireless communication with electronic devices 320 is illustrated in more detail. In the exemplary block diagram of FIG. 3, the base station 310 may be a wireless-enabled video-conferencing unit. In other embodiments, the base station 310 may comprise a wireless-enabled audio conferencing unit without video capability. For example, the base stations 310 may comprise a wireless-enabled speakerphone.

The base station 310 includes one or more speakers 313 and one or more microphones 314 coupled to an audio interface 312. The microphone 314 may be a table-mounted microphone, a microphone pod, ceiling microphone, a microphone array, or other acoustic devices coupled to the audio interface 312 for capturing audio. The base station 310 also includes one or more displays 317 and one or more cameras 318 coupled to a video interface 316. For example, the base station 310 can have two cameras 318—one for capturing a wide angle view of the video-conference environment and one for capturing tight views of participants.

The display 317 is typically a large format television, which then usually also includes the speaker 313.

The base station 310 includes an ultrasonic subsystem 311 for generating, transmitting, and, in some cases, receiving ultrasonic signals. In some embodiments one or more speakers or one or more ultrasonic transducers may be used to transmit the ultrasonic signals. The base station 310 also may include one or more microphones to receive ultrasonic signals if reception is desired. The ultrasonic subsystem 311 may have separate speakers and/or microphones. Alternatively, the ultrasonic subsystem 311 may communicate with the audio interface 312 to use the speaker 313 and microphone 314 for transmitting and receiving the ultrasonic signals.

Internally, in an embodiment, the base station 310 has a processing unit 330. The processing unit 330 executes an audio codec and a video codec stored in the memory 360. The processing unit 330 is connected to the audio and video interfaces 312 and 316 through bus 350 (or similar connection structure) for encoding and decoding audio and video. The base station 310 further includes a network interface 340 for communicating audio, video, and data packages to the electronic devices 320 and the far-end units 345. During a video-conference with the far-end units 345, for example, many of the participants would likely have their own electronic devices 320 available. Users can use their own electronic devices 320 as video-conferencing peripherals by connecting their devices to the base station 310 as disclosed herein.

As part of the network interface 340 or separate therefrom, the base station 310 includes a peripheral interface that enables the base station 310 to communicate with local peripherals, such as the electronic devices 320. In the current example, the network interface 340 connects the base station 310 to a local intranet of a local area network (LAN) 343, which connects in turn to a WAN 344, such as the Internet. The LAN 343 may have a wireless component, such as an 802.11 AP 342, to allow network connections with the electronic devices 320. In general, the network interface 340 can connect to the far-end units 345 via a network connection such as an Ethernet connection, a wireless connection, an Internet connection, a POTS connection (if audio-only), or any other suitable connection or combination thereof.

To conduct a video-conference, for example, the ultrasonic subsystem 311 uses speaker 313 to advertise its availability to the electronic devices 320 in the same room using ultrasonic signals. Subsequently, the participants can connect their electronic devices 320 with the AP 342 to the LAN 343 to communicate with the network interface 340 of the base station 310. The base station 310 receives near-end audio obtained with microphones of the electronic devices 320 via the wireless connections. The base station 310 also receives audio from its own microphone(s) 314. At the same time, the base station 310 receives near-end video obtained with one or more cameras. In an embodiment, the one or more cameras 318 of the base station 310 is used to obtain a video. In an embodiment, the video is obtained from cameras on the electronic devices 320. The base station 310 then communicates the near-end audio and the near-end video to the far-end unit 345 via the video-conferencing connection.

Figure 4:
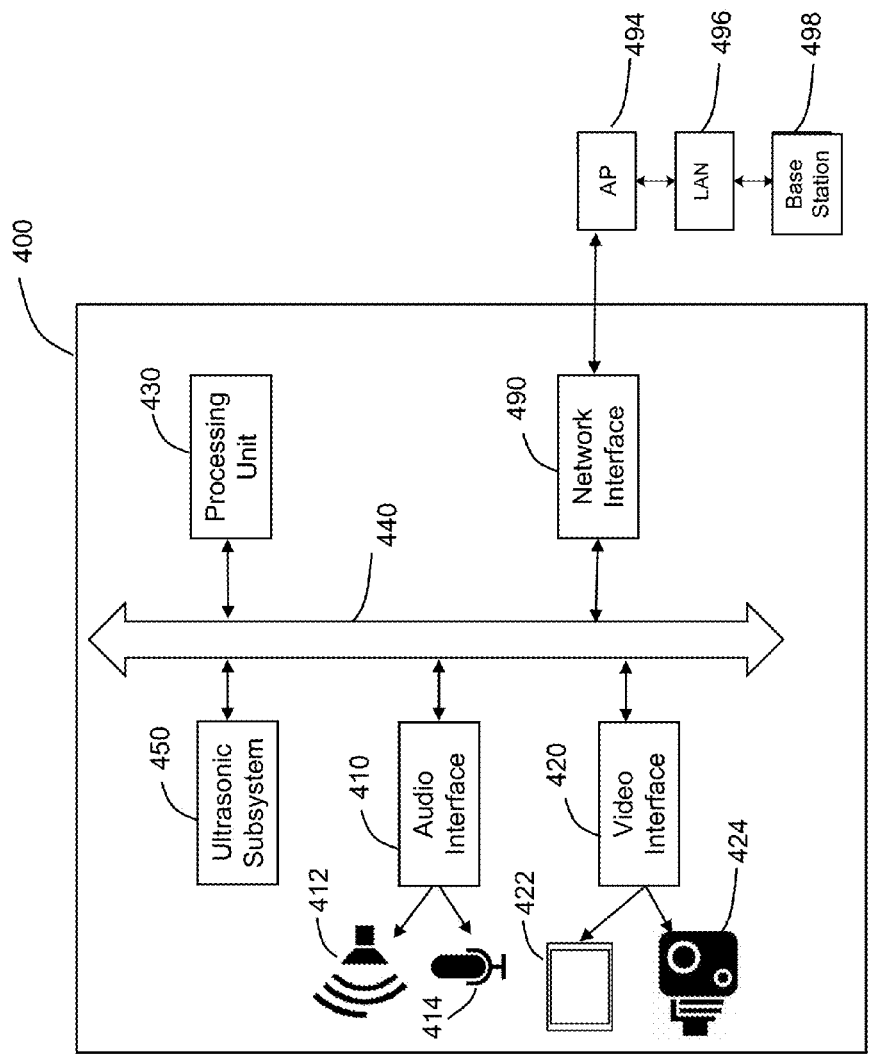
FIG. 4 is a block diagram illustrating a device that may be used, for example, as an electronic device to connect to the base station.

Looking at the electronic devices 320 in more detail, FIG. 4 schematically illustrates an example of an electronic device 400 for use with the disclosed system 300 of FIG. 3. In general, the electronic device 400 can be any of a number of available devices, including, but not limited to, peripheral devices, cellular telephones, smartphones, tablet PCs, touch screen PCs, hand-held computers, netbook computers, laptop computers, and the like. Additionally, the electronic device 400 can have processing capabilities and functionality for operating a camera, a display, and a microphone and for connecting to a network, such as Bluetooth, Wi-Fi network, Internet, and the like.

In an embodiment, the electronic device 400 includes a speaker 412 and a microphone 414 coupled to an audio interface 410. The electronic device 400 also includes a display 422 and a camera 424 coupled to a video interface 420. Internally, the electronic device 400 has a processing unit 430 with an audio codec and a video codec. The processing unit 430 is connected to the audio and video interfaces 410 and 420 through the bus 440 (or similar connection structure) for encoding and decoding the audio and video.

The electronic device 400 may also include an ultrasonic subsystem 450 for receiving, and, in some cases, generating and transmitting, ultrasonic signals. In some embodiments, one or more speakers or one or more ultrasonic transducers may be used to transmit the ultrasonic signals, if transmission is desired. In an embodiment, the electronic device 400 includes one or more microphones to receive the ultrasonic signals provided by the base station 310. In one embodiment, the speaker and the microphone for the ultrasonic subsystem 450 are the microphone 414 and speaker 412. Finally, the electronic device 400 has a network interface 490 connected to the processing unit 430 for communicating audio, video, and data packages with other devices.

In one type of connection, the network interface 490 connects to a LAN 496 via AP 494. The electronic device 400 then communicates with the base station 498 and other electronic devices connected to the same network as LAN 496. In an embodiment, LAN 496 is at least partially based on wireless technology such as a WiFi network. For example, in an embodiment, the network interface 490 connects to AP 494 by wireless communication but the connection between the AP 494 and the base station 498 is through a wired network. In other embodiments, the electronic device 400 uses a short-distance wireless technology such as Bluetooth to directly interact with the base station 310. In an embodiment, the network interface 490 can connect to a typical cellular network and the electronic device 400 can be used for cellular communications. As one skilled in the art will appreciate, any other type of connection can be used to communicate between the electronic device 400 and the base stations. As will also be appreciated, establishing a connection between the electronic device 400 and the base stations requires particular protocols, applications, accounts, and other details that are pre-arranged for the connection to be possible so the details are omitted here.

In one disclosed embodiment, the electronic device uses the microphone 414 to receive ultrasonic signals from the base station 498 located in the same room. The ultrasonic signal is communicated to the ultrasonic subsystem 450 from the microphone 414 through the audio interface 410. The ultrasonic subsystem 450 decodes the ultrasonic signal to determine the unique identifier associated with the base station 498. The unique identifier identifies the base station 498 that is located in the same room as the electronic device 400. Subsequently, the electronic device 400 selects and connects to the specific base station 498 in the room using one of the wireless technologies discussed above. For example, the electronic device can identify the base station using ultrasonic signals and then use WLAN, e.g. Wi-Fi, and/or WPAN radio technology, e.g. Bluetooth, to directly communicate with the specific base station.

Figure 5:
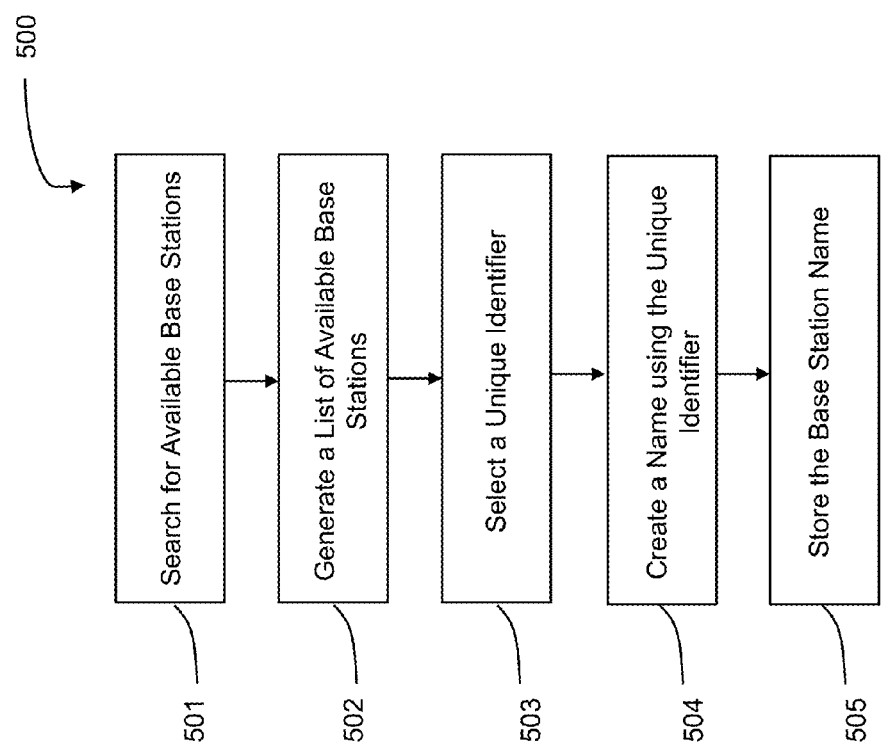
FIG. 5 is a flowchart illustrating an example operation for determining a unique identifier for a base station using a radio scan.

Having discussed the base station 310 (FIG. 3) and the electronic device 400 (FIG. 4), the discussion now turns to how the electronic device 400 establishes a communication with the base station 310. As briefly hinted above, ultrasonic signals may be used to advertise a base station's availability within a physical location and then other wireless technologies may be used to pair two devices based on advertised information. Once the two devices are paired securely, configuration information is exchanged between then to establish network connection. FIG. 5 illustrates a flowchart 500 for determining a unique identifier for a base station using a radio scan described with reference to FIGS. 2, 3, and 4.

At block 501, a first base station may search for one or more other base stations within its wireless range. The first base station may perform a radio scan to collect a list of all other base stations. For example, referring to FIG. 2, the base station 1101 may be a Bluetooth capable device. The base station 1101 can perform a Bluetooth discovery to identify one or more Bluetooth-enabled base stations (e.g. 1102 and 1103) that are within its range. In an embodiment, the base station 1101 may be referred to as a "master", which acts as an inquirer, and the base stations 1102 and 1103 may be referred to as "slaves", which respond to the inquiry scan. When a slave base station receives an inquiry request, it responds with packets that include, among other fields, the discoverable device's address (e.g. network address or Bluetooth address) and a set of attributes (e.g. Class of Device (COD)).

The first base station may use wireless technology other than Bluetooth technology (e.g. WiFi) to discover the base stations within its wireless range if the base stations are also acting as access points. The other base stations may need to be placed in a discoverable mode to be found by the first base station. The wireless range of the base station depends upon the type of wireless technology used. A base station using Bluetooth technology can have a range of more than 33 ft. A base station using WiFi technology can have a range of more than 105 ft.

In an embodiment, the inquiry is made only to the base stations within the range of the master device. There may be multiple master base stations generating lists of slave devices within their reach as each base station is independently performing the steps of FIG. 5. In an embodiment, the inquiry is initiated by a user instruction. In other embodiments, the base station periodically performs a search and automatically initiates generating a list upon discovering one other base station is placed within its vicinity.

At block 502, the first base station generates a list of available base stations based on the search result of the previous step. In one embodiment, the list includes all slave base stations within the wireless range of the master base station. For example, in FIG. 2, the base station 1101 generates a list of available base stations within its range including the base stations 1102 and 1103. Similarly, the base station 1103 generates a list of available base stations including the base stations 1101 and 1102.

At block 503, a unique identifier is selected based on the generated list of the previous step. In an embodiment, the master base station selects a unique identifier to be distinguished from the other base stations in the list. There may be multiple master base stations selecting unique identifiers based on their search results to distinguish themselves from others. In an embodiment, a user can select the unique identifier base on the available options (i.e. the identifiers that are still available because they are not selected by other base stations).

In an embodiment, the unique identifier can be any of a single byte value, a sequence of integers, a short form Uniform Resource Locator (URL), a Service Set Identifier (SSID), or a specific Bluetooth pairing code. For example, referring to FIG. 2, the base station 1101 may be a master device that discovers the other base stations 1102 and 1103. The base station 1101 may generate a list consisting of all three base stations. Then, a unique three digit number (0-255) may be selected by the base station 1101 to distinguish it from the other two base stations. This 8 bit binary number is shorter than the 32 bit or 64 bit IP addresses designated to each of the base stations. For example, the base station 1101 may select number 1 (0000 0001b), if it is not already selected by the base stations 1102 and 1103. When the base station 1102 is selecting a unique identifier, it will determine from the list of available base stations that number 1 is already taken by the base station 1101 and no longer available. Therefore, the base station 1102 may select number 2 (0000 0010b) as its unique identifier. Similarly, the base station 1103 may be identified by number 3 (0000 0011b). The subsequently added base stations assign themselves any of the unused numbers (0000 0000b and 0000 0100b to 1111 1111b) out of 256 numbers.

At block 504, the unique identifier selected from the previous step is used to create a unique name for the base station. In an embodiment, the unique identifier is added to a predetermined term to form the base station's unique name. The predetermined term could be shared between multiple base stations but the unique identifier portion is exclusive to each base station. In an embodiment, the predetermined name can be personalized by a user selection. The predetermined name can also be based on the base station model number, functionality, brand, location, technology, and etc. Therefore, an electronic device can decide between the available base stations to connect to base on a base station's name. For example, a unique identifier can be added to a predetermined name of "Polycom" for all wireless-enabled devices produced by Polycom. For instance, if all the base stations 110 are Polycom devices, then in the example discussed above with respect to the block 503, the base stations 1101 through 1103 may be named "Polycom1", "Polycom2", and "Polycom3" respectively.

Referring back to FIG. 5, at final block 505, the selected unique identifier and the predetermined name are stored in the corresponding base station.

In an alternative embodiment, the base stations may be connected to each other through a network connection. In such an embodiment, one of the base stations may be selected as a master base station. Thereafter, at block 501, the inquiry is made not only to all the base stations within the range of the master device but also all of the base stations within the range of slave base stations. Subsequently, at block 502, a comprehensive list of base stations within the range of all discovered base stations may be generated.

The list of available base stations is generated by the master base station. The master base station is automatically selected to be the device that initiates the discovery and generating the list. The base station that initiates the discovery and generates the list may be designated by a user. Each of the base stations may receive a copy of the generated list of available base stations from the master base station.

At block 503, a unique identifier is selected for each of the discovered base stations. The unique identifier may be determined in a collaborative negotiation between the discovered base stations through the network connection. For example, a slave base station may be part of multiple lists generated by different master devices, therefore, the unique identifier for the slave device may be selected such that it maintains its unique identity in each of the multiple lists. The negotiation can be performed using the same wireless technology that conducted the search inquiry. In an embodiment, the unique identifiers designated to each of the base stations are communicated from the master base station to the corresponding slave base stations. For example, the base station 1101 of FIG. 2 generates a list of available base stations (1101 to 1103) and designates a unique identifier to each (01 to 11 respectively). Then using the Bluetooth technology, for example, these identifiers are communicated with the corresponding base stations.

Figure 6:
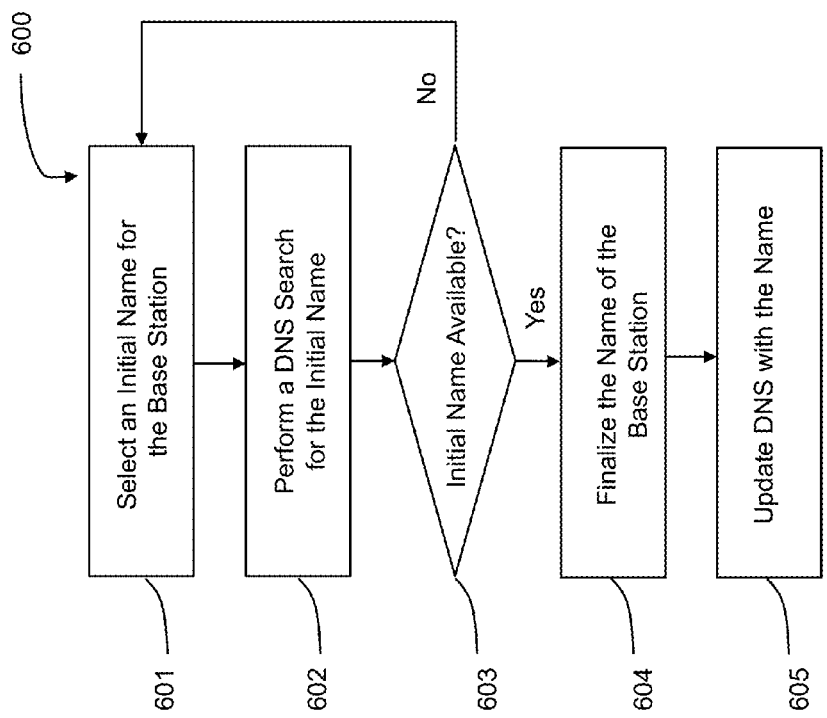
FIG. 6 is a flowchart illustrating an example operation for determining a unique identifier for a base station using a DNS query.

FIG. 5 illustrates the method for determining a unique identifier by performing a radio scan. FIG. 6 illustrates a flowchart 600 for determining a unique identifier by performing Domain Name System (DNS) query. In an embodiment, the method of FIG. 6 can be used, for example, by a base station that is connected to other base stations through a hardwired network. The base station may still use wireless technology to connect to the electronic devices (e.g. BYOD). The flowchart 600 is described with reference to FIGS. 2, 3, and 4. At block 601, the base station selects an initial name. As discussed above with respect to FIG. 5, the base station's name includes a predetermined term and a unique identifier. For example, the predetermined term can be "Polycom", which can be shared by other base stations, and the unique identifier can be a number. The base station checks the availability of the unique identifiers by making a DNS query one by one in a predetermined order. For example, the base station can start with selecting the lowest number first, "1" as its initial unique identifier. If the unique identifier is already used by another base station, then the base station moves to the second lowest digit, "2".

At block 602, the base station searches the DNS to determine whether the initial name is already selected by a different base station. For example, the base station can perform an NSLookup for the initial name to query the DNS. In the example above, the base station at the first step makes a query for the initial name "Polycom1". If it is determined that the initial name is already selected by a different base station, the operation proceeds back to step 601 to select a different initial name. For example, if the base station determines at block 603 that the name "Polycom1" is used by another base station in the network, the base station moves to add the next number to the predetermined term to create the second initial name "Polycom2". The query may continue until the first available name is discovered.

Upon the determination at block 603 that the initial name is available the operation proceeds to block 604. At block 604, the initial name is finally selected as the name of the base station. Therefore the selected name is stored in the base station. Furthermore, at block 605, the base station communicates with DNS server to update the DNS with the finalized name of the base station.

Figure 7:
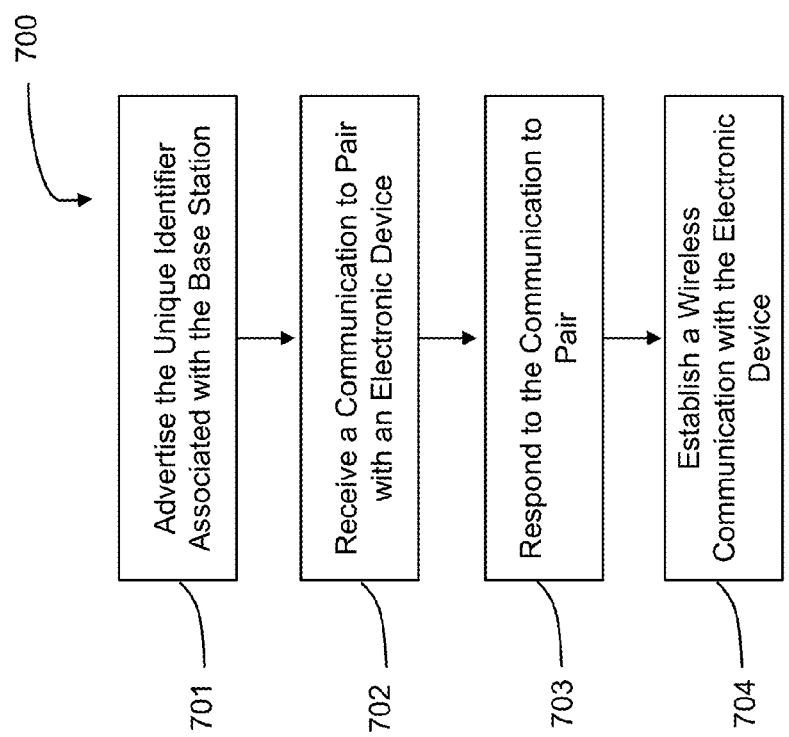
FIG. 7 is a flowchart illustrating an example operation for connecting the base stations to the electronic devices based on the unique identifier.

Referring to FIG. 7, the flowchart 700 illustrates how one or more base stations and one or more electronic devices establish a communication based on the unique identifier according to a disclosed embodiment. FIG. 7 is described with reference to FIGS. 2, 3, and 4.

At block 701, the base station advertises its unique identifier obtained by the operation of FIG. 5 or 6 to other electronic devices. In an embodiment, only devices within the same physical location (e.g. room) will receive the advertising signal from the base station. In an embodiment, the base station emits an ultrasonic signal transmitting the unique identifier of the base station to other electronic devices. For example, in FIG. 3, the base station 310 uses the ultrasonic subsystem 311 to transmit an ultrasonic beacon encoding its unique identifier through its loudspeaker 313 within the Site A to the electronic devices 320.

The ultrasonic beacon is preferably beyond of the audible range but low enough so conventional loudspeaker and microphone components can still have a useful signal response. Therefore, the frequency is preferably above 20 kHz. One acceptable frequency is 21 kHz. Since this frequency is above the human range of hearing, it cannot be heard during the video-conference, for example. Additionally, the beacon purposely has a low volume when it outputs. As will be appreciated, the beacon can use other ultrasonic frequencies.

Transmission of the unique identifier in the beacon preferably uses an audio frequency-shift keying (AFSK) form of frequency modulation with the carrier signal of about 21 kHz. As noted above, the electronic devices 120 having a microphone 414 detect the beacon, decode the unique identifier based on the AFSK modulation, and send a response to the base station 110 via the wireless connection to initiate a communication.

Figure 8:
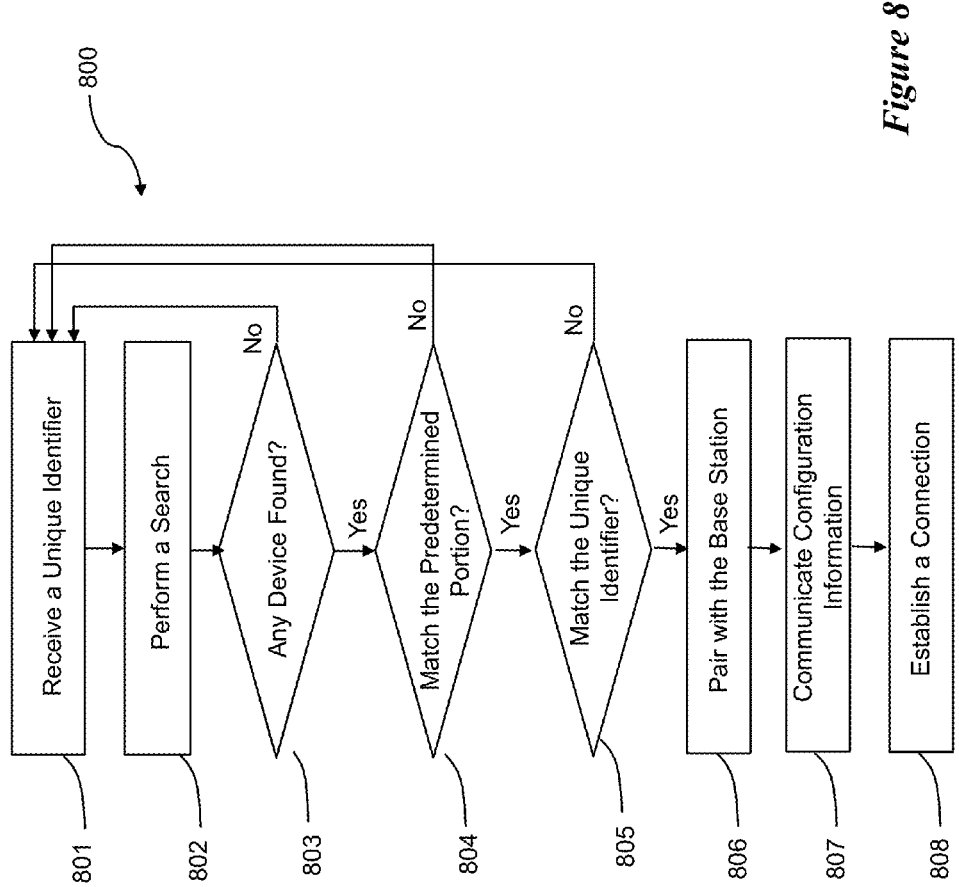
FIG. 8 is a flowchart illustrating an example operation for communication of the electronic device with the base station.
Figure 9:
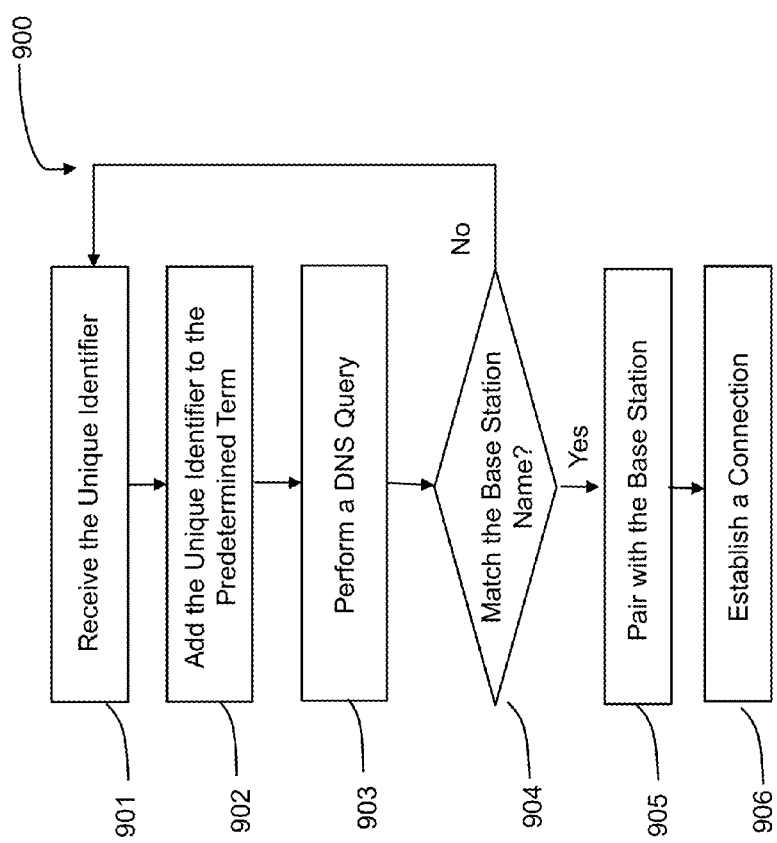
FIG. 9 is a flowchart illustrating an alternative example operation for communication of the electronic device with the base station.

At block 702, the base station receives a pairing request from an electronic device in response to the advertising signal. The electronic device sends the pairing request to the base station that is identified by the unique identifier. At block 703, the base station determines whether to permit the electronic device to pair with the base station and responds to the pairing request by the electronic device. In an embodiment, this handshake between the electronic device and the base station includes verification of a shared authentication key, communicating a security code, and exchanging configuration information. The exchange between the base station and the electronic device depends on the type of wireless communication. Any of the various wireless technologies described above can be used for this exchange. FIG. 8 describes the communication between the devices using technologies such as Bluetooth in more detail. FIG. 9 describes the communication between the devices when the base station does not have sufficient wireless communication capabilities in more detail. Upon the termination of the handshaking between the base station and the electronic device, a wireless connection is established at block 704.

Referring to FIG. 8, the flowchart 800 illustrates the communication of an electronic device with a base station using technologies such as Bluetooth according to a disclosed embodiment. FIG. 8 is described with reference to FIGS. 2, 3, and 4.

At block 801, the electronic device receives a unique identifier. The unique identifier may be transmitted ultrasonically by a base station to other electronic devices within the same physical location. For example, in FIG. 4, the electronic device 400 uses the microphone 414 to receive the ultrasonic signal. The signal is then transmitted to the ultrasonic subsystem 450 through audio interface 410 for decoding. The unique identifier is specific to the transmitting base station.

At block 802, the electronic device performs a wireless search to discover other wireless devices within its range. In an embodiment, a Bluetooth scan is performed to create a list of discovered Bluetooth enabled devices. Normally, instead of providing the hexadecimal Bluetooth addresses of the devices, a list of friendly names of devices is provided, for example, "Polycom2". In other embodiments where each base station is also an access point, a SSID scan is performed to create a list of all WiFi access points within the range of the electronic device. The generated list at this stage may include names of wireless-enabled devices that are located outside the physical location of the electronic device.

At block 803, it is determined whether the wireless search of the previous stage found any device within the range of the electronic device. If no wireless-enabled devices were found, the operation proceeds to block 801. However, if one or more other wireless-enabled devices were found by the wireless search, the operation proceeds to block 804.

At block 804, in an attempt to connect to the correct wireless-enabled device, the electronic device searches the list generated at block 802 to find the devices that include a predetermined term in a portion of their names. In an embodiment, the predetermined portion of the name gives an indication of the type, model, brand, and functionality of the device. For example, in FIG. 2, the electronic device 1201 may generate a list of wireless-enabled devices including electronic devices 1202 to 1205 and also the base stations 1101 to 1103. However, only some of these devices in the list may include the term "Polycom". At block 804, the discovered devices are narrowed down to the devices that include the predetermined term.

If none of the wireless-enabled devices in the list included the predetermined term, the operation proceeds back to block 801. However, if at least one of the wireless-enabled devices in the list included the predetermined term, the operation proceeds to block 805.

At block 805, the narrowed down list of discovered devices generated in the previous step are searched to match the unique identifier received at block 801 with the remaining portion of their names. The unique identifier isolates the devices that are located in the same physical location as the searching electronic device. For example, in previously discussed example of FIG. 3, the electronic device 1201 narrows down the list of discovered devices to the ones that include the term "Polycom". Subsequently, the narrowed list is searched for the devices that include the unique identifier, for example, the digits 01. As such, the base station 1101 with the name of "Polycom1" is identified as the device for the electronic device 1201 to connect to.

At block 806, the electronic device is paired with the base station that is identified in the previous steps. Pairing of two devices is referred to as establishing a secure communication between them after an authentication process. The authentication process can be based on sharing a common Personal Identification Number, for example when Bluetooth is being used. The authentication process for Bluetooth is explained in more detail with reference to FIG. 10. If the base station is a WiFi access point, then the base station and the electronic device can authenticate using conventional WiFi techniques.

At block 807, the network configuration information is communicated between the electronic device and the base station using the secured connection established in the previous step and programs resident on the base station and the electronic device. In an embodiment, the secured connection of the block 806 is used to communicate the configuration information only. Subsequently, at block 808, a second network connection is established using the configuration information as the primary network connection between the devices. The primary connection can be used, for example, for audio/video conferencing. In an embodiment, the second network connection is not a direct wireless connection between the base station and the electronic device. For example, the first network connection can be a low range wireless connection (e.g. Bluetooth) and the second network connection can be through a hardwired network to the base station. In many cases the second connection will include an 802.11 standard connection (e.g. WiFi) from the electronic device to an access point.

The configuration information may include all information necessary to establish the primary network communication between the devices. The configuration information in most cases includes the IP address of the base station. The configuration information can further include encryption keys and other security codes to establish a secure communication.

At block 808, the network connection is established using the configuration information of the previous set. The network connection established between the base station and the electronic devices according to an embodiment disclosed can be used for any suitable communication between the devices. In a video-conferencing system, the network connection allows the participant to send content from the electronic devices 320 to the base station 310 for incorporation into the video-conference. The content can include a video, an image, a document, a presentation, and etc. that resides on the electronic devices 320. Thus, in this arrangement, the electronic devices 320 can act as a content or presentation devices for the base station 310 and can have a video player, an image application, a document application, a presentation application, and etc. for generating the content so the electronic devices 320 can send the content to the base station 310 through the communication. The content presented by the electronic device 320 can subsequently be delivered to the far-end user by the base station 310.

Referring to FIG. 9, the flowchart 900 illustrates the network connection of an electronic device with a base station where the base station does not have any wireless communication capabilities or the base station is acting as an access point but does not include the program necessary to transfer the configuration information directly over its WiFi links. FIG. 9 is described with reference to FIGS. 2, 3, and 4. The flowchart shown in FIG. 9 includes many of the same or similar steps as previously discussed with respect to the flowchart shown in FIG. 8. Accordingly, such repeated steps will not be discussed again with respect to the methods in FIG. 9 for the sake of brevity.

At block 901, the electronic device receives a unique identifier through ultrasonic signals. Step 901 of the flowchart 900 is similar to step 801 of flowchart 800, the discussion of which will not be repeated for the sake of brevity.

At block 902, the electronic device adds the unique identifier obtained in the previous step to a predetermined term to form the name of the specific base station it desires to connect with. The predetermined name may have been entered by a user or obtained by other communication means. The predetermined term may be indicative of the type, model, technology, location, or functionality of the base station. The unique identifier indicates which of the base stations are in the same physical location as the electronic device. The combination of the unique identifier and the predetermined term forms the name of the specific base station.

At block 903, the electronic device searches for the base station with the name obtained in the previous step. For example, referring to FIG. 2, the electronic device 1201 may ultrasonically receive the digit 01 from the base station 1101. Thereafter, the electronic device 1201 adds the digit 01 to predetermined term "Polycom" to generate the name of the base station 1101, "Polycom1". Subsequently, at block 903, the electronic device performs a search to identify the base station that matches such a name. The electronic device may first do a quick WiFi scan for an SSID matching the name.

If found, then the desired base station is present, but the configuration information must still be obtained. The electronic device may try and authenticate with the base station as in step 806 but in this instance the authentication fails and no configuration information is provided In embodiments where the base station has no wireless communication capability or cannot transfer the configuration information over the wireless connection, a Domain Name System (DNS) query may be performed to search for the base station with the specific name generated at block 902. DNS is a naming system that associates readily memorized domain or device names to the IP addresses needed for the purpose of locating and identifying computer devices with the underlying network protocols. Therefore, using DNS query, the name "Polycom1" is translated to the IP address of the base station 1101 in the network. This IP address is subsequently used by the electronic device 1201 in the future steps to connect to the base station 1101.

At block 904, if no base station with such a name is discovered, the operation proceeds to block 901. If the base station with such a name is identified, the operation proceeds to block 905.

At block 905, the IP address is used to communicate with the base station. This step includes a complete authentication process to connect the base station with the electronic device. If the electronic device is authorized, a connection is established at block 906.

Figure 10:
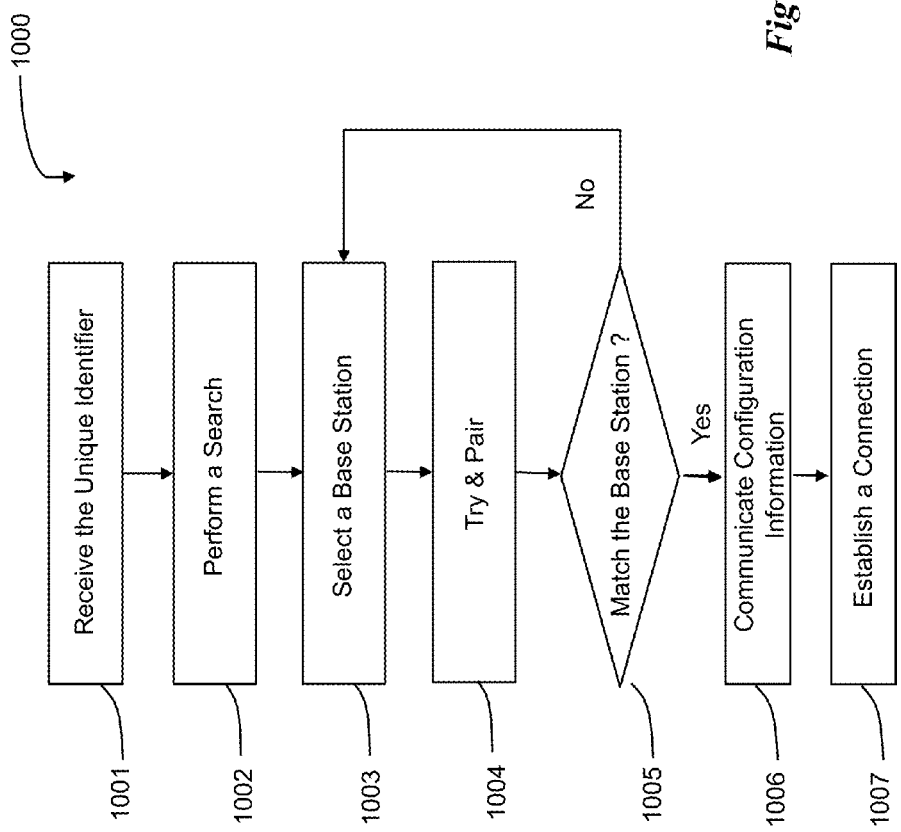
FIG. 10 is a flowchart illustrating an example operation for communication of the electronic device with the base station using a Personal Identification Number.

Referring to FIG. 10, the flowchart 1000 illustrate the communication of the electronic device with the base station using an authentication key for a Bluetooth environment. The previous description used a unique identifier combined with a predetermined term to identify the local base station for further connection over the network. In the embodiment of FIG. 10, a Bluetooth Personal Identification Number (PIN) unique to the base station is provided to the electronic devices ultrasonically. FIG. 10 is described with reference to FIGS. 2, 3, and 4. The flowchart shown in FIG. 10 includes many of the same or similar steps as previously discussed with respect to the flowchart shown in FIG. 8. Accordingly, such repeated steps will not be discussed again with respect to the methods in FIG. 10 for the sake of brevity.

At block 1001, the electronic device receives a unique identifier. Step 1001 of the flowchart 1000 is similar to step 801 of flowchart 800, the discussion of which will not be repeated for the sake of brevity. In an embodiment, the unique identifier received by the electronic device at block 1001 is a PIN associated with the transmitting base station.

The pairing process between a base station and an electronic device involves an authentication process. The authentication process is based on a PIN generated, for example, by a user input. The PIN code may be a 4 digit number. During the pairing process both devices must provide the same PIN for the pairing to be successfully completed. Once the two devices have successfully completed the pairing process, a 128 bit authentication link key is used to avoid the need to enter the PIN every time the devices try to communicate.

At block 1002, the electronic device performs a search to identify the available base stations within its range. Step 1002 of the flowchart 1000 is similar to step 802 of flowchart 800, the discussion of which will not be repeated for the sake of brevity.

At block 1003, the electronic device selects a base station from the list of available base stations generated in the previous step. In an embodiment, the electronic device may select a base station based on a predetermined name. In an embodiment, the base station is selected based on a user instruction.

At block 1004, the electronic device tries to pair with the base station that was selected in the previous step using the PIN it received ultrasonically. At block 1005, if the pairing is successful, the operation proceeds to block 1006 to receive the configuration information. If pairing is not successful, the operation proceeds to step 1003 so that a different base station is selected.

For example, the electronic device 1201 may receive a 4 digit PIN from the base station 1101 ultrasonically. The electronic device then performs a Bluetooth search and identifies a list of available devices including the base stations 1101 to 1103. The electronic device 1201 selects one of the base stations in the list, say the base station 1102. At block 1004, the electronic device 1201 attempts to pair with the base station 1102 based on the 4 digit PIN it received ultrasonically. Because the 4 digit PIN does not match that needed for the base station 1102, the base station rejects the pairing attempt. The process is repeated with base station 1101. This time the pairing is successful because the PIN was that of base station 1101.

The remaining steps 1006 and 1007 of the flowchart 1000 is similar to the steps 807 and 808 of flowchart 800 respectively, the discussion of which will not be repeated for the sake of brevity.

Although the base station is described as the device that sends an ultrasonic beacon encoding its unique identifier, each of the electronic devices can do the same. Therefore, in a reverse pairing arrangement, the base station detects an ultrasonic beacon from an electronic device, decodes the unique identifier to identify the specific device, and establishes a network connection with the electronic device based on the decoded unique identifier. Moreover, the electronic devices can pair with one another using their unique identifier encoded in ultrasonic beacons.

The above discussion has assumed that the base station is also the conferencing device that the electronic device is pairing with. In alternate embodiments the base station does not contain any conferencing capabilities but simply acts as a gatekeeper or credential provider, providing the unique identifier for the actual conferencing device in the room. Pairing and connection are then performed with the actual conferencing device.

The pairing between the devices can disconnect automatically when the electronic device 400 leaves the room or if a user actively disconnects the devices. The electronic device 400 can then connect automatically to another network when entering another room. As discussed before, unlike Bluetooth technology, the ultrasound beacon is limited to the environment (room) of the base station 200 so there may be less chance of overlap between different base stations in a building causing incorrect pairing of the electronic devices to the base stations. Thus, through the ultrasonic signals, the electronic device 400 can identify specifically that the electronic device is in the same environment as the base station 200 and not located somewhere else in a building. By combining a short unique identifier provided by the base station with a commonly known value or a short PIN or SSID value, one well less than the 128 bit IPv6 length and less than the 32 bit IPv4 length in certain cases, the time needed for the ultrasonic transmission is reduced, sometimes greatly, making the process of connecting the electronic device to the base station seem immediate and seamless.

Embodiments disclosed describe room specific pairing of electronic devices using the combination of ultrasonic signal and other wireless means such as Bluetooth. The ultrasonic signal is used to communicate a unique identifier to the electronic devices within the same physical location. An electronic device receiving the ultrasonic signal uses the unique identifier to establish a secure wireless communication with the base station. The wireless communication is then used to communication the configuration information for a second network connection between the base station and the electronic device.

The above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A method of establishing a network connection, the method comprising the steps of:
   detecting an ultrasonic signal provided by a base station with an electronic device;
   decoding a unique identifier partially identifying the base station from the ultrasonic signal;
   combining the unique identifier with a predetermined term to determine a complete identity of the base station;
   performing a search for a base station having the complete identity;
   pairing with the base station identified in the search; and
   establishing a first network connection between the electronic device and the base station identified in the search after completing pairing.

2. The method of claim 1, wherein the step of performing a search is done by determining names provided by base stations within a wireless network range of the electronic device.

3. The method of claim 2, wherein the wireless network is a Bluetooth personal area network (PAN), wherein the pairing has developed a Bluetooth link between the base station and the electronic device, and wherein the names are friendly names of the base stations in the Bluetooth PAN.

4. The method of claim 3, further comprising:
   receiving a first network connection address of the base station over the Bluetooth PAN, the first network connection address used in the step of establishing a first network connection.

5. The method of claim 2, wherein the wireless network is a WiFi network, wherein the base stations are also WiFi access points and the names are SSIDs of the WiFi access points.

6. The method of claim 1, wherein the step of performing a search is done by providing a query for a first network connection address based on the complete identity, and wherein the step of pairing with the base station is done by contacting the base station at a returned first network connection address.

7. The method of claim 1, wherein the base station is a video conferencing unit.

8. An electronic device, comprising:
   an ultrasonic subsystem to receive ultrasonic signals;
   one or more interfaces for communicatively connecting to a base station;
   a processing unit communicatively connected to the ultrasonic subsystem and the one or more interfaces, the processing unit configured to:
      detect the ultrasonic signal provided by the base station;
      decode a unique identifier partially identifying the base station from the ultrasonic signal;
      combine the unique identifier with a predetermined term to determine a complete identity of the base station;
      perform a search for a base station having the complete identity;
      pair with the base station identified in the search; and
      establish a first network connection between the electronic device and the base station identified in the search after completing pairing.

9. The electronic device of claim 8, wherein performing a search by the processing unit includes determining names provided by base stations within a wireless network range of the electronic device.

10. The electronic device of claim 9, wherein the wireless network is a Bluetooth personal area network (PAN), wherein the pairing has developed a Bluetooth link between the base station and the electronic device, and wherein the names are friendly names of the base stations in the Bluetooth PAN.

11. The electronic device of claim 10, wherein the processing unit is further configured to:
   receive a first network connection address of the base station over the Bluetooth PAN, the first network connection address used in establishing a first network connection.

12. The electronic device of claim 9, wherein the wireless network is a WiFi network, wherein the base stations are also WiFi access points and the names are SSIDs of access points.

13. The electronic device of claim 8, wherein performing a search by the processing unit includes performing a search by providing a query for a first network connection address based on the complete identity, and wherein pairing with the base station is done by contacting the base station at a returned first network connection address.

14. The electronic device of claim 8, wherein the base station is a video conferencing unit.

15. A method of establishing a network connection, the method comprising the steps of:
   combining a unique identifier with a predetermined term to create a name for a first base station, wherein the unique identifier distinguishes the first base station from other base stations;
   advertising the unique identifier by an ultrasonic signal to an electronic device;
   receiving a pairing request from the electronic device based on the unique identifier;
   pairing with the electronic device originating the pairing request; and
   establishing a first network connection between the electronic device and the base station after completing pairing.

16. The method of claim 15, wherein the step of receiving a pairing request is done through a Bluetooth personal area network (PAN), and wherein the pairing has developed a Bluetooth link between the base station and the electronic device.

17. The method of claim 16, further comprising the step of:

sending a first network connection address of the base station over the Bluetooth PAN, the first network connection address used in the step of establishing a first network connection.

18. The method of claim 15, wherein the step of receiving a pairing request is done through a WiFi network and the base stations are also WiFi access points.

19. The method of claim 15, wherein the base station is a video conferencing unit.

20. A base station device, comprising:
a memory;
an ultrasonic subsystem for generating an ultrasonic signal;
one or more interfaces for communicatively connecting to an electronic device;
a processing unit communicatively connected to the ultrasonic subsystem, the memory, and the one or more interfaces, the processing unit configured to:
combine a unique identifier with a predetermined term to create a name for a first base station, wherein the unique identifier distinguishes the first base station from other base stations;
advertise the unique identifier by an ultrasonic signal to an electronic device;
receive a pairing request from the electronic device based on the unique identifier;
pair with the electronic device originating the pairing request; and
establish a first network connection between the electronic device and the base station after completing pairing.

21. The base station of claim 20, wherein receiving a pairing request is through a Bluetooth personal area network (PAN), and wherein the pairing has developed a Bluetooth link between the base station and the electronic device.

22. The base station of claim 21, wherein the processing unit is further configured to:
send a first network connection address of the base station over the Bluetooth PAN, the first network connection address used in the step of establishing a first network connection.

23. The base station of claim 20, wherein receiving a pairing request is through a WiFi network and the base stations are also WiFi access points.

24. The base station of claim 20, wherein the base station is a video conferencing unit.

* * * * *